(12) United States Patent
Mao et al.

(10) Patent No.: US 8,066,968 B2
(45) Date of Patent: Nov. 29, 2011

(54) X-RAY-INDUCED DISSOCIATION OF $H_2O$ AND FORMATION OF AN $O_2$-$H_2$ ALLOY AT HIGH PRESSURE

(75) Inventors: Ho-kwang Mao, Washington, DC (US); Wendy L. Mao, Washington, DC (US)

(73) Assignee: Carnegie Institution of Washington, Washington, DC (US)

( * ) Notice: Subject to any disclaimer, the term of this patent is extended or adjusted under 35 U.S.C. 154(b) by 649 days.

(21) Appl. No.: 12/257,537

(22) Filed: Oct. 24, 2008

(65) Prior Publication Data

US 2009/0108237 A1    Apr. 30, 2009

Related U.S. Application Data

(60) Provisional application No. 60/996,074, filed on Oct. 26, 2007.

(51) Int. Cl.
*C01B 13/00* (2006.01)

(52) U.S. Cl. .................................................. 423/579
(58) Field of Classification Search .............. 423/579, 423/580.1
See application file for complete search history.

(56) References Cited

U.S. PATENT DOCUMENTS 4,228,132 A * 10/1980 Weems et al. ............... 422/174

* cited by examiner

*Primary Examiner* — Wayne Langel
(74) *Attorney, Agent, or Firm* — Morgan Lewis & Bockius LLP

(57) ABSTRACT

A novel molecular alloy of $O_2$ and $H_2$ and a method of producing such a molecular alloy are provided. When subjected to high pressure and extensive x-radiation, $H_2O$ molecules cleaved, forming O—O and H—H bonds. In the method of the present invention, the O and H framework in ice VII was converted into a molecular alloy of $O_2$ and $H_2$. X-ray diffraction, x-ray Raman scattering, and optical Raman spectroscopy demonstrate that this crystalline solid differs from previously known phases.

4 Claims, 6 Drawing Sheets

Figure 1:
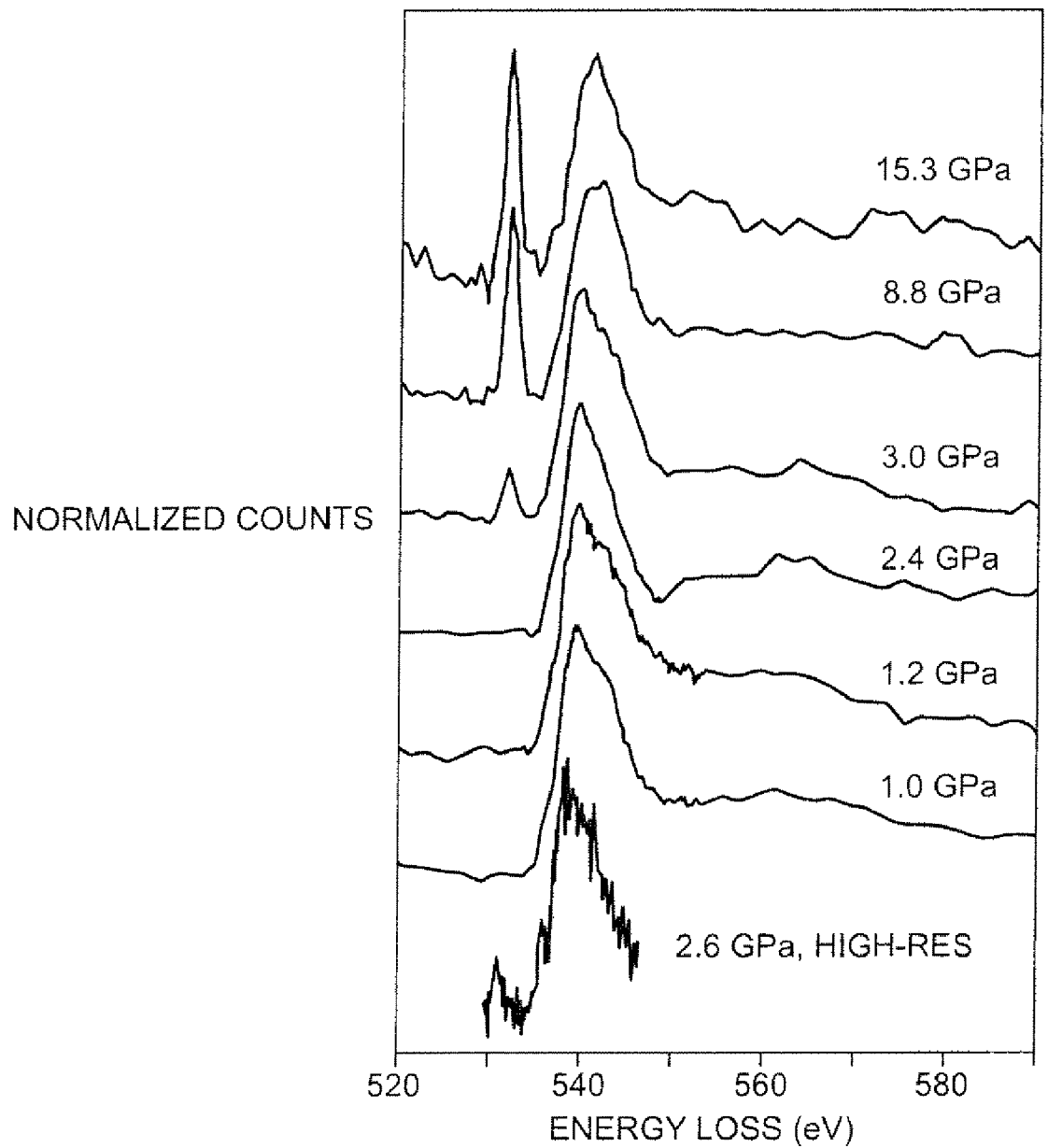

X-RAY-INDUCED DISSOCIATION OF $H_2O$ AND FORMATION OF AN $O_2$-$H_2$ ALLOY AT HIGH PRESSURE

This application claims the benefit of U.S. Provisional Application No. 60/996,074, filed Oct. 26, 2007, which is hereby incorporated by reference in its entirety.

STATEMENT OF GOVERNMENT INTEREST

This invention was made with U.S. government support under grant number DE-FG02-99ER45775 from the Basic Energy Sciences, Department of Energy. The U.S. government has certain rights in the invention.

BACKGROUND OF THE INVENTION

1. Field of the Invention

The present invention relates generally to a novel molecular alloy of $O_2$ and $H_9$ and a method of producing such a molecular alloy.

2. Discussion of the Related Art $H_2O$ forms at least 15 stable (1) and metastable crystalline (2-5) and amorphous ices (6-9). Its rich phase diagram displays a range of exotic behavior such as symmetric hydrogen bonds (10-12), superionic ice (13, 14), and multiple critical points (15, 16).

Applicants excited $H_2O$ with high-energy x-radiation in order to access a larger portion of the energy landscape at high pressure. Although at ambient pressure x-rays are known to produce metastable free radicals in molecular systems or to induce stable reactions by overcoming kinetic energy barriers, documented examples of x-ray induced transitions at high pressure have been extremely rare.

SUMMARY OF THE INVENTION

Broadly stated, the present invention is directed to a novel molecular alloy of $O_2$ and $H_2$ and a method of producing such a molecular alloy. The compound of the present invention has never been produced before.

Additional features and advantages of the invention will be set forth in the description which follows, and will be apparent from the description, or may be learned from practice of the invention. The objectives and other advantages of the invention will be realized and attained by the structure particularly pointed out in the written description and claims.

To achieve these objects and other advantages and in accordance with the purpose of the invention, as embodied and broadly described, applicants disclose that when subjected to high pressure and extensive x-radiation, $H_2O$ molecules cleaved, forming O—O and H—H bonds. In the method of the present invention, the O and H framework in ice VII was converted into a molecular alloy of $O_2$ and $H_2$. X-ray diffraction, x-ray Raman scattering, and optical Raman spectroscopy demonstrate that this crystalline solid differs from previously known phases. It remained stable with respect to variations in pressure, temperature, and further x-ray and laser exposure, thus opening new possibilities for studying molecular interactions in the fundamental $O_2$—$H_2$ system.

It is to be understood that both the foregoing general description and the following detailed description of the present invention are exemplary and explanatory and are intended to provide further explanation of the invention as claimed.

BRIEF DESCRIPTION OF THE FIGS.

FIG. 1. XRS of $H_2O$ sample at high pressure after 12 hours of irradiation. Bottom spectra at 2.6 GPa was measured at beamline BL12XU, SPring-8 using 9.886 keV x-radiation with high energy resolution (300 meV). All other spectra for 1.0, 1.2, 2.4, 3.0, 8.8, and 15.3 GPa were measured with 9.687 keV x-radiation at beamline 13-IDC, APS, ANL with 1 eV resolution.

FIG. 2. Photomicrographs of two DAC samples. Top four panels were taken at 13-IDC, APS, ANL. (A) After XRS measurement at 13-IDC, APS, ANY at 8.8 GPa. The light brown streak through the middle of sample shows the portion irradiated by the x-ray beam. A small ruby ball on left the edge of gasket was used for pressure calibration. (B) After release of pressure to below 1 GPa, bubbles of $O_2$ and $H_2$ formed. (C) Bubbles collapsed upon increase of pressure as the $H_2$ and $O_2$ were incorporated into the crystalline sample. (D) Sample after XRS measurement at 15.3 GPa. Bottom two panels were taken at BL12XU, SPring-8. (E) Before and (F) after x-ray exposure at 2.6 GPa.

Figure 3:
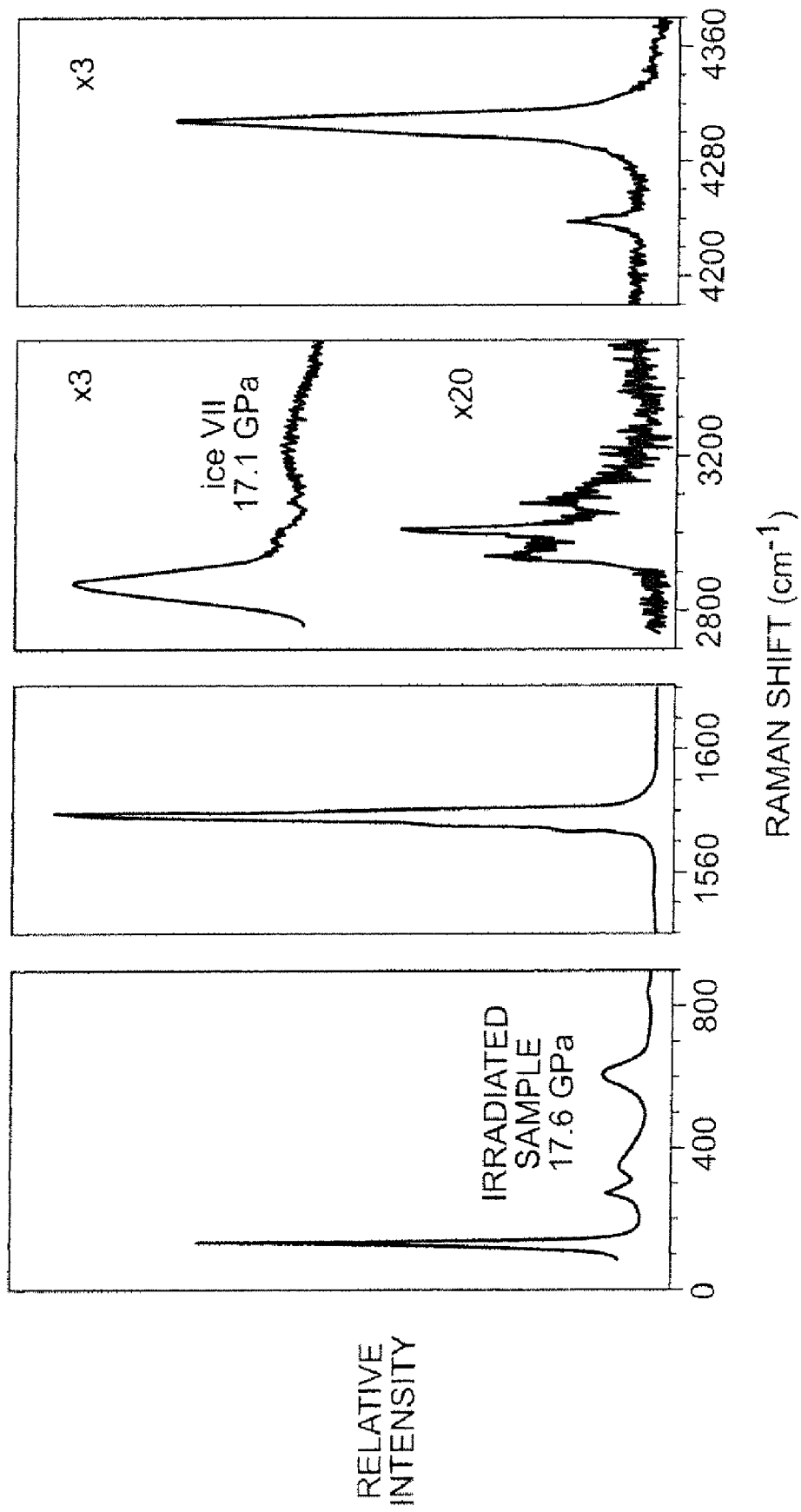

FIG. 3. ORS of irradiated sample at 17.6 GPa. ORS of an un-irradiated ice VII sample at 17.1 GPa is shown for comparison; all measurements are based on the same exposure time; intensity scaling are noted by multiplication factors. The Raman modes in the sample are excited using $Ar^+$ ion laser radiation at 488 nm.

Figure 4A:
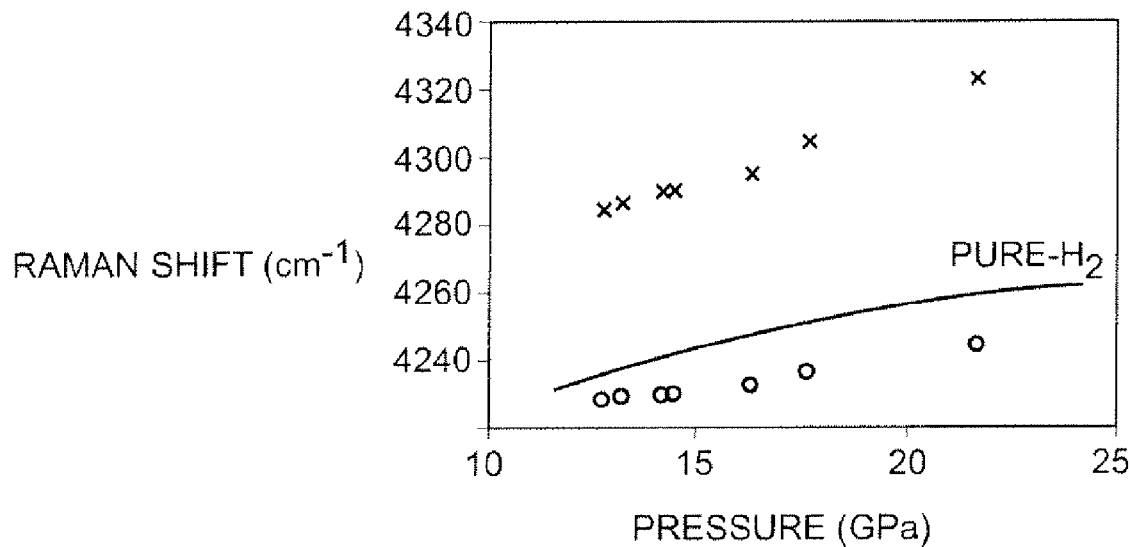
Figure 4B:
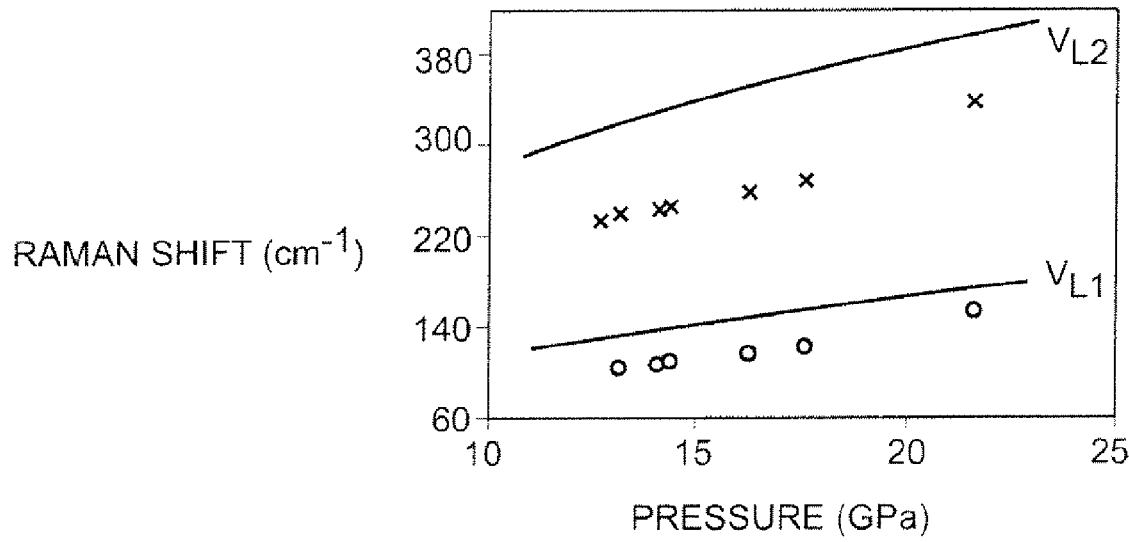

FIG. 4. Pressure dependence of ORS shift for the $O_2$—$H_2$ alloy. (A) Symbols show positions for $H_2$ vibron doublet. The line shows position for pure $H_2$ vibron (20). (B) Symbols show observed $O_2$ librational peak positions. The lines show librational modes of $\epsilon$-$O_2$ (21, 22).

Figure 5:
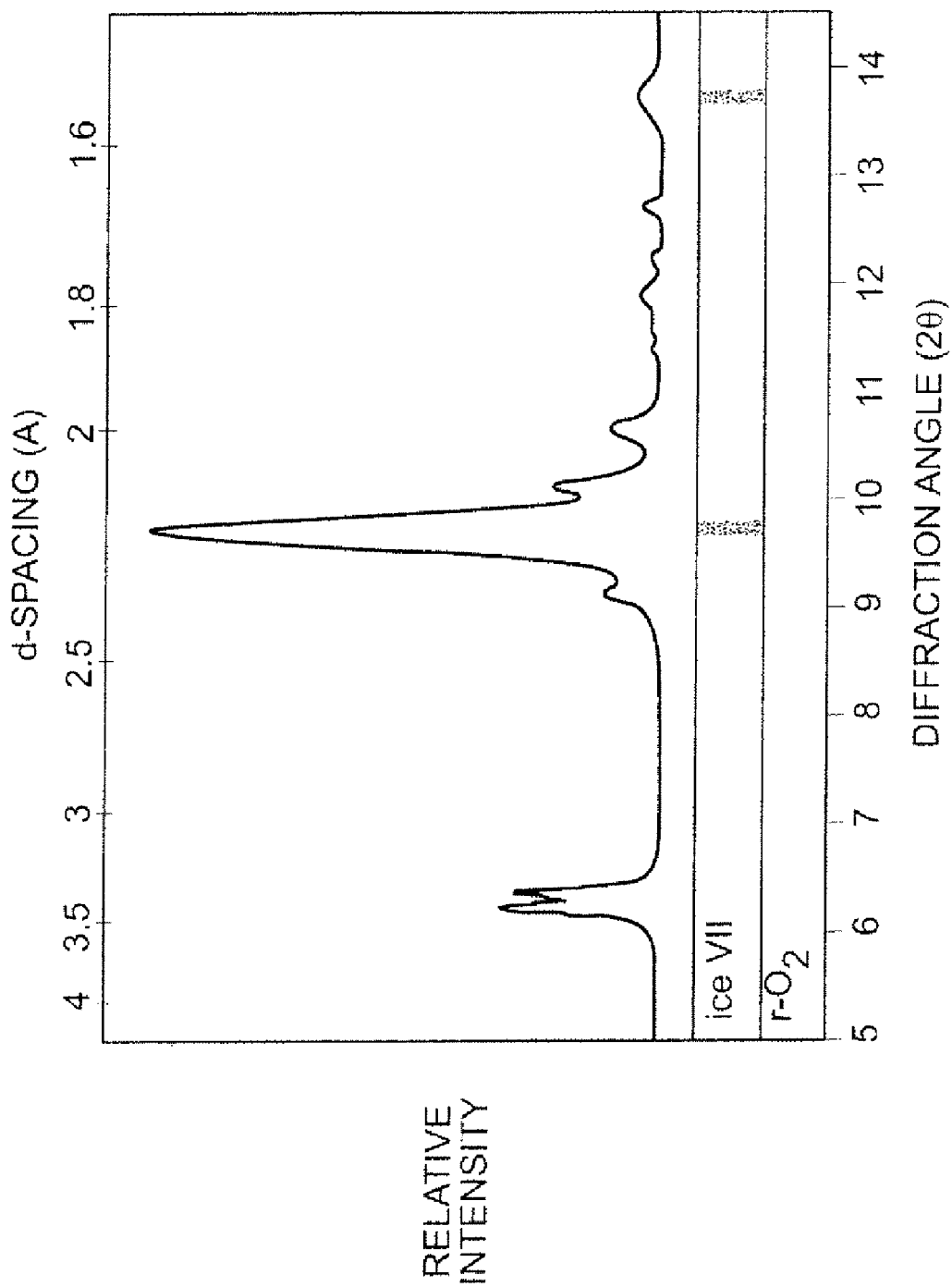

FIG. 5. Integrated XRD pattern of the irradiated sample at 15.3 GPa where $\lambda$=0.36819 Å. Comparison for expected peak positions at 15.3 GPa for $\epsilon$-$O_2$ (21, 26) and ice VII (31) at 15.3 GPa are shown as dark and grey bars, respectively.

Figure 6:
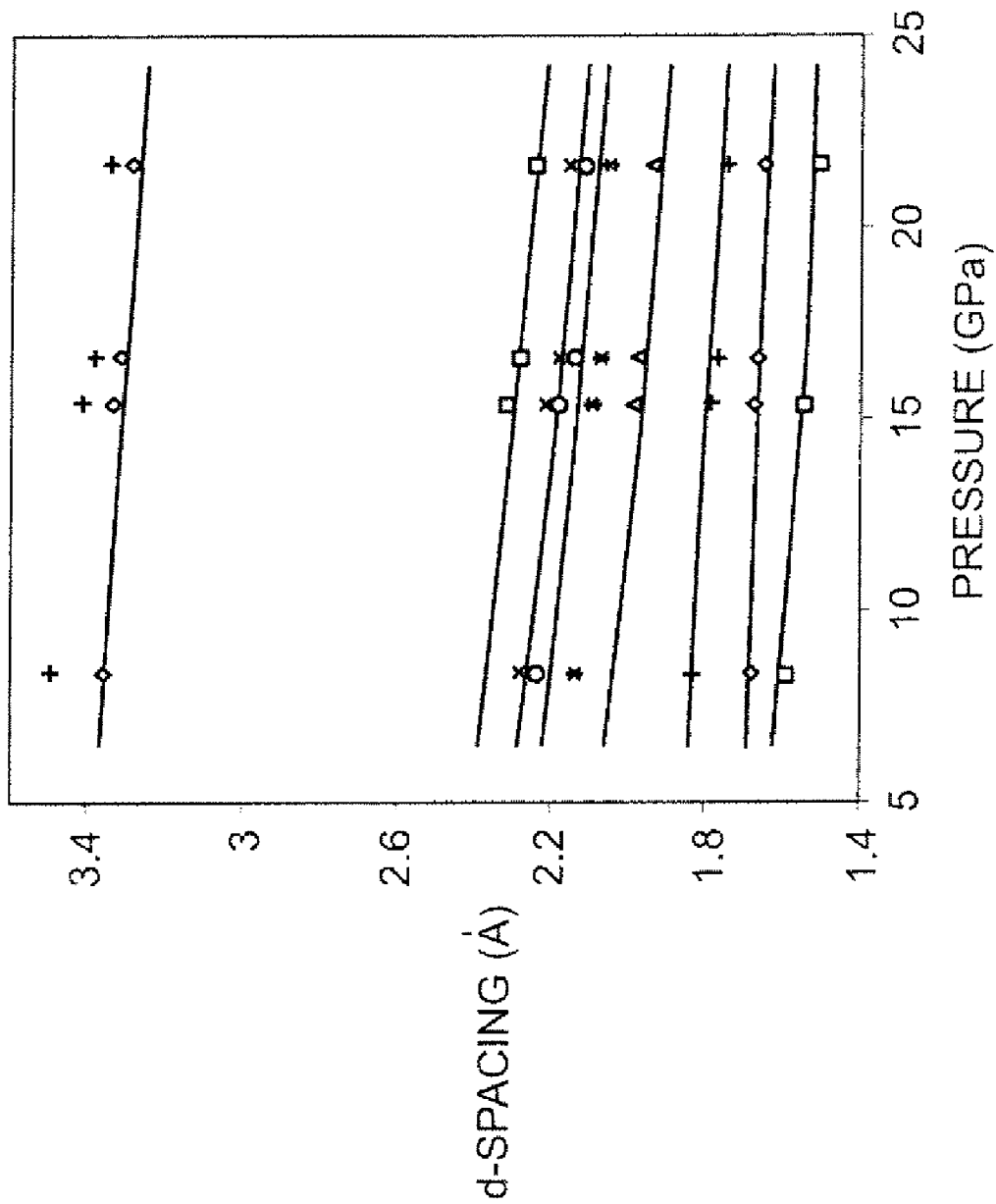

FIG. 6. Pressure dependence of d-spacings for reflections from the new $O_2$—$H_2$ alloy. Solid and dotted lines show pressure dependence for $\epsilon$-$O_2$ (21, 26) and ice VII (31), respectively.

DETAILED DESCRIPTION OF THE INVENTION

Reference will now be made in detail to the present invention and preferred embodiments.

Figure 2A:
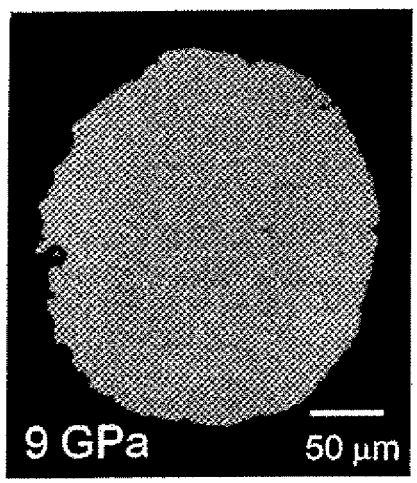

Applicants observed the x-ray and pressure-induced cleaving of $H_2O$ in an oxygen K-edge study with a high-pressure x-ray Raman scattering (XRS) technique (5, 17-19) that requires long exposure of moderately high energy (~10 keV) x-radiation. For oxygen bonded with hydrogen in $H_2O$, the K-edge XRS spectra are dominated by a cluster of peaks around 540 eV as shown in dense water below 0.9 GPa, ice VI between 1 and 2 GPa, and ice VII just above 2 GPa (FIG. 1). At pressures above 2.5 GPa, however, x-radiation induced dramatic, irreversible changes in the XRS spectra. A distinctive, sharp peak appeared at 530 eV characteristic of O—O bonding in $O_2$ and grew with time, reaching a plateau after 6 hours of exposure to the incident x-ray beam (FIG. 1). The plateau intensity increased with increasing pressure, and at 15.3 GPa, the height of the 530 eV peak matched that of the main 540 eV multiplet. Applicants observed the reaction independently at the Advanced Photon Source (APS) and SPring-8 during high-pressure XRS measurements of $H_2O$ (FIG. 1). Visually, the sample changed from colorless to light brown after the conversion (FIG. 2A). Optical Raman scattering (ORS) measurements showed intense, characteristic $H_2$ and $O_2$ vibrons and a diminished $H_2O$ signal (FIG. 3), clearly demonstrating the dissociation of $H_2O$ molecules and the recombination into $O_2$ and $H_2$ molecules.

The resultant $O_2$ and $H_2$ molecules did not exist in the known high pressure phases of hcp-$H_2$ and $\epsilon$-$O_2$, but formed an alloy consisting of both molecular $O_2$ and $H_2$. To better understand this material, applicants varied x-ray energy and exposure time, interval between exposure and measurement, pressure, and temperature, and studied the samples with ORS and x-ray diffraction (XRD). At 17.6 GPa after x-radiation, the OH vibrational modes around 3000 $cm^{-1}$ became diminishingly weak and exhibited a different shape in comparison to ice VII (FIG. 3), indicating that the $H_2O$ molecules had mostly cleaved, leaving only a minor component in the new $O_2$—$H_2$ alloy. One can rule out the hcp-$H_2$ and $\epsilon$-$O_2$ phases based on their characteristic ORS spectra. The intense $Q_1(1)$ $H_2$ molecular vibron at 4304 $cm^{-1}$ (FIG. 3) is 59 $cm^{-1}$ above the $Q_1(1)$ of pure hcp-$H_2$ (4245 $cm^{-1}$) (20). The weak side peak at 4236 $cm^{-1}$ indicates a small amount (<5%) of $H_2$ in a different site or possibly in a new secondary phase. The $H_2$ molecular rotons: $S_0(0)$, $S_0(1)$, and $S_0(2)$ at 360, 610, and 847 $cm^{-1}$, respectively, are characteristic of freely rotating $H_2$ molecules. The $O_2$ ORS vibron frequency (1577 $cm^{-1}$) is similar to that of $\epsilon$-$O_2$ (21, 22), but the intense, low-frequency, librational peaks at 123 and 272 $cm^{-1}$) are substantially lower in frequency than the characteristic, $v_{L1}$ and $v_{L2}$ modes of $\epsilon$-$O_2$ at 155 and 360 $cm^{-1}$, respectively, indicating that this is not $\epsilon$-$O_2$. The observation of a single $O_2$ vibron and a predominant $H_2$ vibron is consistent with a new alloy conserving the $O_2$:$H_2$ ratio of approximately 1:2, i.e. $(O_2)(H_2)_2$, although we cannot rule out the possibility of a minor secondary phase with a different $O_2$:$H_2$ ratio, corresponding to the weak $H_2$ side peak at 4236 $cm^{-1}$.

The $H_2$ vibron stiffening in mixed crystals have been used extensively to reveal information on matrix isolation and intermolecular interactions of $H_2$ (23, 24). The vibron turnover of pure hcp-$H_2$ (20) shifts to higher pressure in the mixed crystals, and the effect increases with increasing molecular fraction of other molecules such as Ne, HD, and $D_2$ (23, 24). In the present sample, the main $H_2$ vibron shows substantial stiffening, which suggests that a large amount of $O_2$ molecules are present (FIG. 3). The pressure shifts of the ORS $O_2$ librational peaks and $H_2$ vibrons are shown in FIG. 4 and compared with corresponding peaks of hcp-$H_2$ and $\epsilon$-$O_2$. Similar pressure dependence and constant offset of ORS peaks of the present alloy with respect to the pure endmembers indicates these peaks have similar origins but different matrices effects, Applicants conducted XRD studies of the $H_2$—$O_2$ alloy at beamline 16-IDB of HPCAT, APS, ANL. Sharp powder diffraction rings indicate that the alloy is a well-crystallized solid. Its diffraction pattern (FIG. 5) shows some similarity to, but does not exactly fit, $\epsilon$-$O_2$ (25-27). For instance, they both have a multiplet group between 2-2.4 Å, and the alloy has a doublet near 3.4 Å where $\epsilon$-$O_2$ has a singularly strong peak (25). At this point, it is premature to present a definitive crystal structure or unit cell based on only 10 powder XRD lines. The d-spacings of the alloy, $\epsilon$-$O_2$, and ice VII vary similarly with pressure implying that all have similar compressibilities (FIG. 6).

Figure 2B:
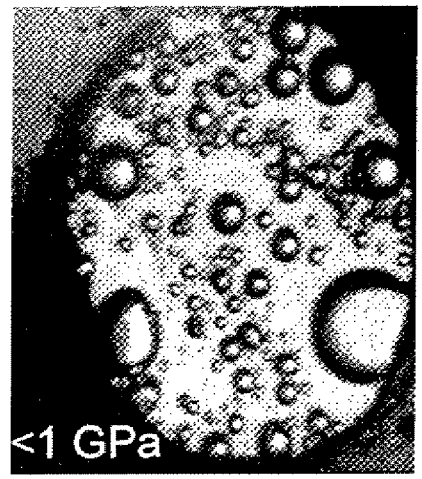
Figure 2C:
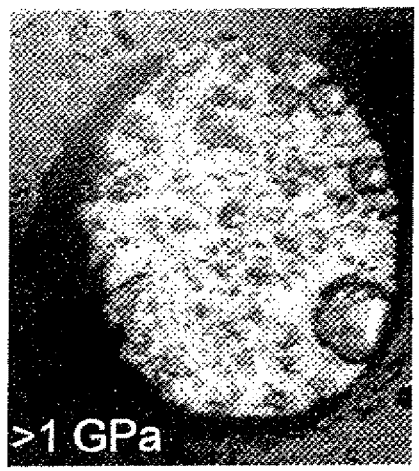
Figure 2D:
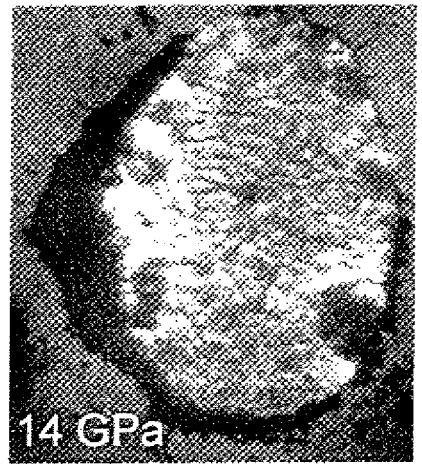
Figure 2E:
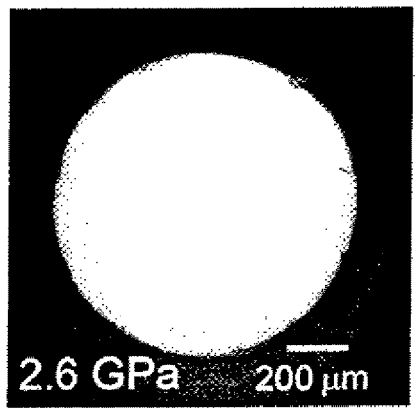
Figure 2F:
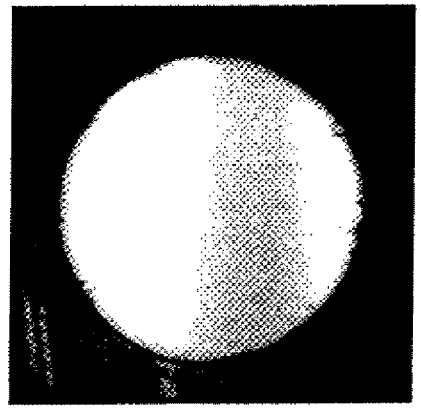

Once synthesized and kept at high pressure, the new phase was stable with respect to laser exposure, further x-radiation, and being stored for time intervals of over 120 days. Bubbles of $O_2$-$H_2$ gaseous mixture (identified by ORS) were released from the solid when the pressure was reduced below 1 GPa (FIG. 2B). When these bubbles were compressed to high pressures and irradiated with x-rays again they reformed the new alloy (FIG. 2D). Formation of this material has thus been approached from both directions: starting with $H_2O$ and with an $O_2$—$H_2$ mixture. Heated in a diamond-anvil cell, the alloy is stable up to 700 K at 15 GPa. At higher temperature, this material reverts to ice VII near melting.

Partial dissociation of ice VII was previously observed by Lin et al. (28) in high pressure-temperature experiments of $H_2O$, but the reaction conditions and products were different. At high temperature and without x-radiation Lin et al. detected a minor amount of $\epsilon$-$O_2$ (but no $H_2$) as a result of hydrogen loss to the metal gasket. The present observation differs from the reported high-pressure study of hydrogen peroxide, $H_2O_2$, which transformed to a high-pressure phase $H_2O_2$-II, or decomposed to $H_2O$ +$O_2$, but did not produce any $H_2$ molecules (29). The present observation also differs from the previously reported $(O_2)_3(H_2)_4$ phase at 7.5-10 GPa (30) which was unstable and combusted during x-radiation. Moreover, the $O_2$ and $H_2$ ORS vibrons of the $(O_2)_3(H_2)_4$ phase agree with those of $\epsilon$-$O_2$ and hcp-$H_2$ respectively and thus differ from our alloy.

The kinetic stability of the new material implies that there is an energy minimum separated from ice VII by a large energy barrier. The barrier may be too high to cross by thermal excitation alone, as it has not been observed in high P-T experiments up to 1000 K (14, 28) which is equivalent to 0.08 eV. The 10 keV x-rays we used provide access to a large range of local energy minimum states including both ground and trapped excited electronic states of $O_2$ and $H_2$. It may be puzzling why this new phase was not discovered earlier in hundreds of previous XRD studies of high-pressure ices. Applicants conducted a reconnaissance study using several different monochromatic x-ray energies of 9.687, 9.886, 14.414 and 33.678 keV. The x-ray-induced reaction in ice VII was most effective with the 9.687 and 9.886 keV x-radiation, which are absorbed readily by $H_2O$, was less effective with 14.414 keV x-radiation, and was not observed with 33.678 keV high-energy x-radiations which passed through $H_2O$ without adequate absorption. High-pressure synchrotron XRD studies typically use high-energy x-radiation above 20 keV with short exposure times of seconds to minutes; this would be insufficient to induce the reaction. On the other hand, low-energy x-radiation below 12 keV would be largely absorbed by the diamond anvils, and are seldom used for XRD studies. In our experiments the ~10 keV x-rays pass through the low-absorbance Be gasket and provide optimal conditions for inducing the reaction.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

REFERENCES

1. V. F. Petrenko, R. W. Whitworth, *Physics of Ice* (Oxford Univ. Press, Oxford; N.Y., 1999), pp. xi, 373p.
2. I.-M. Chou et al., *Science* 281, 809 (1998).
3. C. Lobban, J. L. Finney, W. F. Kuhs, *Nature* 391, 268 (1998).
4. J. S. Tse, D. D. Klug, *Phys. Rev. Lett.* 81, 2466 (1998).
5. Y. Q: Cal et al., *Phys. Rev. Lett* 94, 025502 (2005).
6. O. Mishima, L. D. Calvert. F. Whalley, *Nature* 310, 393 (1984).
7. R. J. Hemley, L. C. Chen, H. K. Mao, *Nature* 338, 638 (1989).
8. J. L. Finney et al. *Phys. Rev. Lett.* 88, 225503 (2002).
9. C. A. Tulk et al., *Science* 297, 1320 (2002).

10. A. F. Goncharov et al., *Science* 273, 218 (1996).
11. M. Bernasconi, P. L. Silvestrelli, M. Parrinello, *Phys. Rev. Lett.* 81, 1235 (1998).
12. A. F. Goncharov, V. V. Struzhkin, H. K. Mao, R. J. Hemley, *Phys. Rev. Lett.* 83, 1998 (1999).
13. C. Cavazzoni et al., *Science* 283, 44 (1999).
14. A. F. Goncharov et al., *Phys. Rev. Lett.* 94, 125508 (2005).
15. O. Mishima, H. E. Stanley, *Nature* 396, 329 (1998).
16. L. Liu et al., *Phys. Rev. Lett.* 95, 117802 (2005).
17. W. L. Mao et al., *Science* 302, 425 (2003).
18. Y. Meng et al., *Nature Mat.* 3, 111 (2004).
19. S. K. Lee et al., *Nature Mat.* 4, 851 (2005).
20. S. K. Sharma, H. K. Mao, P. M. Bell, *Phys. Rev. Lett.* 44, 886 (1980).
21. Y. A. Freiman, H. J. Jodl, *Phys. Reports* 401, 1 (2004).
22. Y. Akahama, H. Kawamura, *Phys. Rev. B* 54, R15602 (1996).
23. P. Loubeyre, R. Letoullec, J. P. Pinceaux, *Phys. Rev. Lett.* 67, 3271 (1991).
24. D. M. Brown, W. B. Daniels, *Phys. Rev. A* 45, 6429 (1992).
25. H. Fujihisa et al., *Phys. Rev. Lett.* 97, 085503 (2006).
26. Y. Akahama et al., *Phys. Rev. Lett.* 74, 4690 (1995).
27. G. Week, P. Loubeyre, R. LeToullec, *Phys. Rev. Lett.* 88, 035504 (2002).
28. J.-F. Lin et al., *Geophys. Res. Lett.* 32, L11306 (2005).
29. H. Cynn, C. S. Yoo, S. A, Sheffield, *J. Chem. Phys.* 110, 6836 (1999).
30. P. Loubeyre, R. LeToullec, *Nature* 378, 44 (1995).
31. Y. Fei, H. K. Mao, R. J. Hemley, *J. Chem. Phys.* 99, 5369 (1993).

What is claimed is:

1. An $O_2$—$H_2$ molecular alloy, wherein the $O_2$ ORS vibron frequency is 1577 cm$^{-1}$ and the intense, low frequency vibrational peaks are at 123 and 272 cm$^{-1}$.

2. An $O_2$—$H_2$ molecular alloy, wherein the intense Q1 (1) $H_2$ molecular vibron is 4304 cm$^{-1}$.

3. The $O_2$—$H_2$ molecular alloy of claim 2, wherein the weak side peak is 4236 cm$^{-1}$.

4. The $O_2$—$H_2$ molecular alloy of claim 2, wherein the $H_2$ molecular rotons: $S_0(0)$, $S_0(1)$, and $S_0(2)$ are 360, 610, and 847 cm$^{-1}$, respectively.

* * * * *